2,802,741

CAKE MIXES CONTAINING WATER-SOLUBLE CELLULOSE ETHERS

Miles A. Weaver, Ithaca, and George K. Greminger, Jr., Midland, Mich., assignors to The Dow Chemical Company, Midland, Mich., a corporation of Delaware No Drawing. Application September 21, 1953, Serial No. 381,495

4 Claims. (Cl. 99—94)

This invention relates to improved cake mixes, and especially to an improvement in those prepared dry mixtures of cake ingredients which are sold in a condition requiring the addition only of milk or water to make a cake batter ready for baking.

Most cake recipes require eggwhites or both whites and yolks. Other normal ingredients are flour, milk, shortening, sugar, salt, spices or flavoring, and baking powder or soda, with wide variations in proportions being used. Ready-mixed dry cake ingredients, containing dried eggwhites, are packaged and sold at retail, with instructions to add water or milk, stir and bake. Such mixtures make fairly satisfactory cakes, but, in common with those made from fresh liquid eggs, it is found that the more they rise during baking, the coarser is their texture. It is desired to overcome this problem, so as to produce a fine-texture in the cake, and to minimize the cost of dried eggwhites used in such prepared mixes.

It has now been found that the desired ends are attained and that improved cakes are produced when up to half of the normal amount of eggwhites is replaced, at the ratio of about 0.5 ounce per ounce of replaced eggwhite solids, by a water-soluble cellulose ether from the group consisting of methyl cellulose, hydroxypropyl methyl cellulose and carboxymethyl hydroxyethyl cellulose. Since fresh, liquid eggwhites contain an average of 14 percent solids and 86 percent water, the cellulose ether may be substituted for liquid eggwhites at the ratio of about 0.5 ounce cellulose ether for 7 ounces of replaced eggwhite whenever cakes are being made with fresh eggs.

The basic recipe, which was modified by partial replacement of the eggwhites with cellulose ethers in the examples given below, is as follows:

| | Ounces |
|---|---|
| Cake flour | 10 |
| Sugar | 12 |
| Shortening | 4½ |
| Milk | 6 |
| Baking powder | |
| Salt | |

These ingredients are mixed to a creamy consistency, and there is added:

| | Ounces |
|---|---|
| Eggwhites | 7 |
| Milk | 4 |
| Vanilla | |

The batter is mixed thoroughly and poured into tins and baked 20 minutes at 400° F.

In each of several batches, part of the eggwhite was replaced by the kind and amount of cellulose ether listed below. The reported viscosity of each cellulose ether was determined on a 2 percent aqueous solution of a sample of the ether at 20° C.

Table 1

| Batch No. | Cellulose Ether | Viscosity, Centipoises | Weight Cellulose Ether Used, Ounces | Weight Eggwhite, Ounces | |
|---|---|---|---|---|---|
| | | | | Used | Replaced by Ether |
| 1 | Methyl Cellulose | 100 | .375 | 1.75 | 5.25 |
| 2 | do | 15 | .25 | 3.5 | 3.5 |
| 3 | do | 4,000 | .25 | 3.5 | 3.5 |
| 4 | Hydroxypropyl Methyl Cellulose | 50 | .25 | 3.5 | 3.5 |
| 5 | Carboxymethyl Methyl Cellulose | 40 | .25 | 3.5 | 3.5 |
| 6 | Carboxymethyl Cellulose | 50 | .25 | 3.5 | 3.5 |
| 7 | Carboxymethyl Hydroxyethyl Cellulose | 1,500 | .25 | 3.5 | 3.5 |
| 8 | Hydroxyethyl Cellulose | 100 | .25 | 3.5 | 3.5 |
| 9 | Methyl Cellulose | 100 | .30 | 2.1 | 4.9 |

Each batter was rated as normal or heavy, and observations were recorded as to the extent to which the cake rose during baking, whether it fell, and the internal color, texture, taste and deviation from normal moisture content. These observations are reported in Table 2.

Table 2

| Batch No. | Batter | Rise | Fall | Color | Texture | Taste | Dryness |
|---|---|---|---|---|---|---|---|
| Control | Normal | Good | No | White | Slightly Coarse | Good | Normal. |
| 1 | do | Excellent | Yes | do | Slightly Coarse—Soggy | do | Very Moist. |
| 2 | do | Very Good | No | do | Fine | do | Normal. |
| 3 | do | Good | No | do | Very Fine | do | Do. |
| 4 | do | do | No | do | Fine | do | Slightly Moist. |
| 5 | Heavy | do | Slight | Off-White | Slightly Coarse | Fair | Do. |
| 6 | Normal | do | No | do | do | do | Do. |
| 7 | do | do | No | do | Fine | do | Normal. |
| 8 | Heavy | Fair | No | do | Coarse | do | Slightly Moist. |
| 9 | Normal | Excellent | Yes | White | Slightly Coarse—Soggy | Good | Very Moist. |

As a result of these and other tests, it has been found that certain water-soluble cellulose ethers can replace from one-tenth to slightly over one-half of the eggwhite solids, at a ratio of 0.5 ounce of the cellulose ether for each ounce of replaced eggwhite solids, or 1 ounce of the cellulose ether for each 7 ounces of replaced liquid eggwhite. When much more than half of the eggwhite is replaced by cellulose ether, the cake becomes too moist, tending to sogginess. At the preferred concentration, the cellulose ether gives the cake a finer texture than when made with the normal amount of eggs. The viscosity rating of the cellulose ether does not appear to have a very marked effect on the properties of the cake, but there is a little evidence that the higher viscosity types of cellulose ether are slightly better than the low viscosity materials. The cellulose ethers which are acceptable are those used in batches 2, 3, 4 and 7 in the foregoing tables, namely, methyl cellulose, hydroxypropyl methyl cellulose and carboxymethyl hydroxyethyl cellulose. Of these, methyl cellulose gives best results, and hydroxypropyl methyl cellulose is the next best. The ionic nature of carboxymethyl hydroxyethyl cellulose is such as to permit a chelating reaction with some of the calcium salts in the milk, and this may possibly account for the slight difference in results noted when this compound was used. Carboxymethyl cellulose, carboxymethyl methyl cellulose and hydroxyethyl cellulose were each unsatisfactory under the standard test conditions, mainly because of the coarse texture of the cakes obtained.

In all of the mixed cellulose ethers named herein, the first named substituent is present in smaller proportion than the second named substituent, and is usually present in amounts from 0.05 to 0.5 groups per $C_6$ unit in the cellulose molecule, while the second named substituent is present in amounts from 0.5 to 2, and usually from 1.5 to 2, groups per $C_6$ unit.

We claim:

1. In the preparation of a cake mix, the improvement which consists in substituting a water-soluble cellulose ether from the class consisting of methyl cellulose, hydroxypropyl methyl cellulose and carboxymethyl hydroxyethyl cellulose for from 0.1 to about 0.5 of the normal amount of eggwhite, at a ratio of about 0.5 part by weight of the cellulose ether for each part by weight of displaced eggwhite solids.

2. The method claimed in claim 1, wherein the cellulose ether employed is water-soluble methyl cellulose.

3. A cake mix comprising the normal constituents in their normal proportions except that from 0.1 to about 0.5 of the normal amount of eggwhite solids are replaced by about 0.5 their weight of a water-soluble cellulose ether from the class consisting of methyl cellulose, hydroxypropyl methyl cellulose and carboxymethyl hydroxyethyl cellulose.

4. The cake mix claimed in claim 3, wherein the cellulose ether is methyl cellulose.

References Cited in the file of this patent

UNITED STATES PATENTS

| | | |
|---|---|---|
| 1,495,789 | Hamor | May 27, 1924 |
| 1,943,374 | Dreyfus | Jan. 16, 1934 |
| 2,302,511 | Wallach | Nov. 17, 1942 |
| 2,664,422 | Downing | Dec. 29, 1953 |

FOREIGN PATENTS

| | | |
|---|---|---|
| 592,011 | Great Britain | Sept. 4, 1947 |
| 684,561 | Great Britain | Dec. 17, 1952 |

OTHER REFERENCES

Morrison et al.: Jour. Sci. Chem. Ind., "Water-soluble cellulose ethers as emulsifying agents," December 1949, pages 333 to 336.